US008438647B2

(12) United States Patent
Jevans

(10) Patent No.: US 8,438,647 B2
(45) Date of Patent: May 7, 2013

(54) RECOVERY OF ENCRYPTED DATA FROM A SECURE STORAGE DEVICE

(75) Inventor: David Alexander Jevans, Los Altos, CA (US)

(73) Assignee: Imation Corp., Oakdale, MN (US)

( * ) Notice: Subject to any disclaimer, the term of this patent is extended or adjusted under 35 U.S.C. 154(b) by 721 days.

(21) Appl. No.: 11/523,968

(22) Filed: Sep. 19, 2006

(65) Prior Publication Data
US 2007/0101434 A1    May 3, 2007

Related U.S. Application Data

(63) Continuation-in-part of application No. 11/486,799, filed on Jul. 14, 2006.

(60) Provisional application No. 60/698,899, filed on Jul. 14, 2005, provisional application No. 60/718,272, filed on Sep. 19, 2005.

(51) Int. Cl.
*H04N 7/16*     (2006.01)

(52) U.S. Cl.
USPC ............................................ 726/26; 713/165

(58) Field of Classification Search .................. 726/26; 713/165
See application file for complete search history.

(56) References Cited

U.S. PATENT DOCUMENTS

| | | | |
|---|---|---|---|
| 4,578,530 A | 3/1986 | Zeidler | |
| 5,010,571 A * | 4/1991 | Katznelson | ...................... 705/53 |
| 5,265,159 A | 11/1993 | Kung | |
| 5,341,339 A | 8/1994 | Wells | |
| 5,404,485 A | 4/1995 | Ban | |
| 5,479,638 A | 12/1995 | Assar et al. | |
| 5,857,021 A | 1/1999 | Kataoke et al. | |
| 5,937,425 A | 8/1999 | Ban | |
| 6,032,227 A | 2/2000 | Shaheen et al. | |
| 6,092,196 A | 7/2000 | Reiche | |
| 6,118,874 A * | 9/2000 | Okamoto et al. | ............. 380/282 |
| 6,223,284 B1 | 4/2001 | Novoa | |
| 6,292,899 B1 | 9/2001 | McBride | |
| 6,731,536 B1 | 5/2004 | McClain | |
| 6,763,468 B2 | 7/2004 | Gupta et al. | |
| 6,776,332 B2 | 8/2004 | Allen et al. | |
| 6,791,877 B2 | 9/2004 | Miura et al. | |

(Continued)

FOREIGN PATENT DOCUMENTS

WO    WO 02/47081 A2    6/2002

OTHER PUBLICATIONS

Denning et al., A Taxonomy for key Escrow Encryption Systems, Mar. 1996, ACM, vol. 39 Issue 3.*

(Continued)

*Primary Examiner* — Brandon Hoffman
*Assistant Examiner* — Samuel Ambaye
(74) *Attorney, Agent, or Firm* — Kenneth E. Levitt; Dorsey & Whitney LLP

(57) ABSTRACT

An exemplary software product to recover encrypted data from a target secure storage device can comprise software operational when executed by a processor to receive a recovery request to recovery the encrypted data, send a transfer command to the target secure storage device, receive an authorization request from the target secure storage device in response to the transfer command, respond to the authorization request, and receive the encrypted data from the target secure storage device.

33 Claims, 8 Drawing Sheets

U.S. PATENT DOCUMENTS

| | | | |
|---|---|---|---|
| 6,834,795 B1 | 12/2004 | Rasmussen et al. | |
| 6,920,527 B2 | 7/2005 | Cloutier et al. | |
| 6,961,852 B2 | 11/2005 | Craft | |
| 6,987,927 B1 | 1/2006 | Battaglia et al. | |
| 6,993,661 B1 | 1/2006 | Garfinkel | |
| 7,266,699 B2 | 9/2007 | Newman et al. | |
| 7,272,723 B1 | 9/2007 | Abbott et al. | |
| 7,275,139 B1 | 9/2007 | Tormasov et al. | |
| 7,278,025 B2 | 10/2007 | Saito et al. | |
| 7,360,091 B2 | 4/2008 | Aikawa et al. | |
| 7,412,420 B2 | 8/2008 | Holdsworth | |
| 7,475,425 B2 | 1/2009 | Bantz et al. | |
| 7,478,248 B2 | 1/2009 | Ziv et al. | |
| 7,631,191 B2 | 12/2009 | Glazer et al. | |
| 7,685,425 B1 | 3/2010 | Wright et al. | |
| 7,698,442 B1 | 4/2010 | Krishnamurthy et al. | |
| 7,757,088 B2 | 7/2010 | Abdulhayoglu | |
| 8,015,606 B1 | 9/2011 | Jevans et al. | |
| 2001/0045451 A1 | 11/2001 | Tan et al. | |
| 2002/0029215 A1* | 3/2002 | Whitmyer, Jr. | 707/10 |
| 2002/0046342 A1 | 4/2002 | Elteto et al. | |
| 2003/0005336 A1 | 1/2003 | Poo et al. | |
| 2003/0041253 A1 | 2/2003 | Matsui et al. | |
| 2003/0149670 A1* | 8/2003 | Cronce | 705/59 |
| 2003/0149854 A1 | 8/2003 | Yoshino et al. | |
| 2003/0182584 A1 | 9/2003 | Banes | |
| 2003/0204735 A1 | 10/2003 | Schnitzmeier | |
| 2003/0204754 A1 | 10/2003 | Cromer et al. | |
| 2003/0215090 A1 | 11/2003 | Saito et al. | |
| 2004/0059925 A1 | 3/2004 | Benhammou et al. | |
| 2004/0073797 A1 | 4/2004 | Fascenda | |
| 2004/0103288 A1 | 5/2004 | Ziv et al. | |
| 2004/0103325 A1 | 5/2004 | Priebatsch | |
| 2004/0123113 A1 | 6/2004 | Mathiassen et al. | |
| 2004/0146015 A1 | 7/2004 | Cross et al. | |
| 2004/0148333 A1 | 7/2004 | Manion et al. | |
| 2004/0177258 A1 | 9/2004 | Ong | |
| 2004/0188710 A1 | 9/2004 | Koren et al. | |
| 2005/0015540 A1 | 1/2005 | Tsai et al. | |
| 2005/0020315 A1 | 1/2005 | Robertson | |
| 2005/0044377 A1* | 2/2005 | Huang | 713/182 |
| 2005/0055519 A1 | 3/2005 | Stuart et al. | |
| 2005/0182973 A1 | 8/2005 | Funahashi et al. | |
| 2006/0016875 A1 | 1/2006 | Bonalle et al. | |
| 2006/0021059 A1 | 1/2006 | Brown et al. | |
| 2006/0041932 A1* | 2/2006 | Cromer et al. | 726/6 |
| 2006/0047717 A1 | 3/2006 | Pereira | |
| 2006/0069840 A1 | 3/2006 | Corbett et al. | |
| 2006/0095688 A1 | 5/2006 | Kawamura et al. | |
| 2006/0117393 A1 | 6/2006 | Merry et al. | |
| 2006/0129830 A1 | 6/2006 | Haller et al. | |
| 2006/0143476 A1 | 6/2006 | McGovern | |
| 2006/0179309 A1 | 8/2006 | Cross et al. | |
| 2006/0208066 A1 | 9/2006 | Finn et al. | |
| 2006/0224742 A1 | 10/2006 | Shahbazi | |
| 2006/0236363 A1 | 10/2006 | Heard et al. | |
| 2007/0016743 A1 | 1/2007 | Jevans | |
| 2007/0016756 A1 | 1/2007 | Hsieh et al. | |
| 2007/0028033 A1 | 2/2007 | Hsieh et al. | |
| 2007/0033330 A1 | 2/2007 | Sinclair et al. | |
| 2007/0038802 A1 | 2/2007 | Tsai et al. | |
| 2007/0056043 A1 | 3/2007 | Onyon et al. | |
| 2007/0067620 A1 | 3/2007 | Jevans | |
| 2007/0118898 A1 | 5/2007 | Morgan et al. | |
| 2007/0143530 A1 | 6/2007 | Rudelic et al. | |
| 2007/0143532 A1 | 6/2007 | Gorobets et al. | |
| 2007/0180509 A1 | 8/2007 | Swartz et al. | |
| 2007/0250919 A1 | 10/2007 | Shull et al. | |
| 2007/0266421 A1 | 11/2007 | Vaidya et al. | |
| 2007/0300031 A1 | 12/2007 | Jevans et al. | |
| 2007/0300052 A1 | 12/2007 | Jevans | |
| 2008/0005561 A1 | 1/2008 | Brown et al. | |
| 2009/0222117 A1 | 9/2009 | Kaplan et al. | |

OTHER PUBLICATIONS

U.S. Appl. No. 11/486,799, David Jevans, Secure Storage Device with Offline Code Entry, Jul. 14, 2006.

U.S. Appl. No. 11/517,129, David Jevans, Systems and Methods for Third-Party Authentication, Sep. 6, 2006.

U.S. Appl. No. 11/634,763, David Jevans, Storage Device with Website Trust Indication, Dec. 5, 2006.

U.S. Appl. No. 11/644,051, David Jevans, Detachable Storage Device with Ram Cache, Dec. 21, 2006.

U.S. Appl. No. 11/644,089, David Jevans, Storage Device with Accessible Partitions, Dec. 21, 2006.

U.S. Appl. No. 11/765,424, David Jevans, Recovery of Data Access for a Locked Secure Storage Device, Jun. 19, 2007.

U.S. Appl. No. 11/827,258, David Jevans, Memory Data Shredder, Jul. 10, 2007.

Tal, Arie. "Two Technologies Compared: NOR v. NAND", White Paper, 01-SR-012-04-8L, Rev. 1.1, Jul. 2003, pp. 1-14.

National Institute of Standards and Technology. "Federal Information Processing Standards Publication 197." Nov. 2001.

Kingston. "Kingston Data Traveler Elite: Advanced Security and High Performance." Oct. 2004. http://www.kingstom.com/digitalmedia/dt_elite.wp.pdf.

Army Regulation 380-19. "Information Systems Security." Feb. 27, 1998. Department of the Army. Appendix F. pp. 28-30.

Sedaghat et al. "A Dynamic Web Agent for Verifying the Security and Integrity of a Web Site's Contents," IEEE, Aug. 2002.

Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.

Fischer, Viktor et al. "True Random No. Generator Embedded in Reconfigurable Hardware." Springer-Verlag. Lecture Notes in Computer Science. vol. 2523, pp. 415-430. 2003.

* cited by examiner

RECOVERY OF ENCRYPTED DATA FROM A SECURE STORAGE DEVICE

CROSS-REFERENCE TO RELATED APPLICATIONS

This application claims benefit to U.S. provisional patent Ser. No. 60/718,272, filed Sep. 19, 2005, entitled "Computer Device Encryption Key and Data Recovery Mechanism," and is a continuation-in-part of U.S. nonprovisional application Ser. No. 11/486,799, filed Jul. 14, 2006, entitled "Secure Storage Device with Offline Code Entry," which claims the benefit of U.S. provisional patent Ser. No. 60/698,899, filed Jul. 14, 2005, entitled "Secure Storage Device with Offline Password Entry," all of which are incorporated by reference herein.

BACKGROUND

1. Field of the Invention

The present invention relates generally to encryption, and more particularly to recovery of encrypted data from a secure storage device.

2. Background Art

As data processing becomes ubiquitous, users are increasingly demanding that data be both mobile and secure. Although networks, such as the Internet, can transmit data from one computer to another, users often must identify and transmit the data they need to the proper destination. Unfortunately, the data may fail to be transmitted due to firewalls, proxies, spam blockers, size limitations, technical error, or human error. Further, it is not always practical for users to guess what data is needed at a future time and the location of the need. The data is also often routed through unsecure servers or network devices which can intercept the data and further compromise security.

As a result of these problems, users often load data on USB memory devices (e.g., a memory stick) and carry data with them. Unfortunately, USB memory devices can be stolen and accessed by thieves. Some USB memory devices have passwords which must be entered on the host computer before accessing the stored data. However, the password can be cracked (e.g., a brute force attack) and the data accessed.

Some USB memory devices lock the stored data after a predetermined number of password attempts have been made to prevent data theft. Unfortunately, the lock is often easy to reset. Further, the attacker may overcome the lock with a computer. In one example, the attacker copies the data and the lock stored in the USB memory device on a computer and attempts to enter the password. The lock may lock the copied data after the predetermined number of password attempts. The attacker may then delete the copied data and the copied lock from the computer, and recopy the data and the lock from the USB memory device to try again. This process can be repeated and automated until successful thereby inevitably accessing the data.

Although security measures may prevent unauthorized people from stealing data, the same security measures may prevent authorized people from legitimate access. In one example, the CIO of a company may encourage the issuance of USB memory devices with security measures to the employees of the company. However, the security on the USB memory devices may ultimately prevent the CIO or his agent from accessing data should one or more employees be unavailable.

SUMMARY OF THE INVENTION

An exemplary software product to recover encrypted data from a target secure storage device can comprise software operational when executed by a processor to receive a recovery request to recovery the encrypted data, send a transfer command to the target secure storage device, receive an authorization request from the target secure storage device in response to the transfer command, respond to the authorization request, and receive the encrypted data from the target secure storage device.

The software product maybe further operational when executed by the processor to retrieve an encryption key from an authorized secure storage device, and decrypt the encrypted data with, at least in part, the encryption key. Further, the software product may be further operational when executed by the processor to retrieve a plurality of encryption keys from a plurality of authorized secure storage devices, unlock a decryption key with the plurality of encryption keys, and decrypt the encrypted data with the decryption key.

Responding to the authorization request may comprise the software product further operational when executed by the processor to digitally sign at least a part of an authorization request response with an encryption key from an authorized secure storage device, and send the digitally signed authorization request response to the target secure storage device. Alternately, responding to the authorization request may comprise the software product further operational when executed by the processor to decrypt at least a part of the authorization request with an encryption key from an authorized secure storage device, and send the encrypted authorization request to the target secure storage device. In some embodiments, the transfer command is digitally signed.

In various embodiments, the encrypted data is stored within a single data partition within the target secure storage device. The encrypted data may also be from at least one data partition within the target secure storage device. In exemplary embodiments, a determination to select a data partition within the target secure storage device to retrieve encrypted data is based, at least in part, on the response to the authorization request.

The software product may be further operational when executed by the processor to transmit an authentication identifier to the target secure storage device. The authentication identifier may be a password or a biometric identifier, such as a fingerprint, voiceprint, or retina scan.

The software product may also be further operational when executed by the processor to store a verification encryption key and/or store an encrypted decryption key within the target secure storage device. The verification encryption key and the encrypted decryption key may be stored within the target secure storage device before the target secure storage device is used to store data. The verification encryption key may be used to verify the transfer request and/or verify an authorization request response. The encrypted decryption key may be decrypted by one or more public encryption keys.

An exemplary method to recover encrypted data from a target secure storage device can comprise receiving a recovery request to recovery the encrypted data, sending a transfer command to the target secure storage device, receiving an authorization request from the target secure storage device in response to the transfer command, responding to the authorization request, and receiving the encrypted data from the target secure storage device.

An exemplary system to recover encrypted data from a target secure storage device can comprise a communication interface and a processor. The communication interface may be configured to couple with the target secure storage device. The processor may be configured to receive a recovery request to recovery the encrypted data, send a transfer command to the target secure storage device, receive an authorization quest from the target secure storage device in response to the transfer command, respond to the authorization request, and receive the encrypted data from the target secure storage device.

DETAILED DESCRIPTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A secure storage device can be used to securely store, port, and access encrypted data. A secure storage device is any portable memory device that stores encrypted data. Examples of secure storage devices include, but are not limited to, USB memory devices, flash memory devices, NAND memory devices, and portable hard drives.

A user code and decryption key may be used to access and decrypt the encrypted data within the secure storage device. In some embodiments, the decryption key is contained within the secure storage device. Unfortunately, the data contained within the secure storage device may be needed by an authorized user even if the user code and/or the decryption code are unavailable. In one example, the authorized user is a CIO of a company who wishes to access data within an employee's secure storage device when the employee is unavailable.

In exemplary embodiments, the authorized user may receive the encrypted data from a target secure storage device and decrypt the encrypted data with a recovery software or a recovery device. The target secure storage device is any secure storage device that comprises encrypted data to be recovered. The recovery software or recovery device may be in communication with the target secure storage device and an authorized secure storage device comprising an encryption key. The authorized secure storage device is any secure storage device that may be used or is required by the recovery software and/or recovery device to retrieve encrypted data from the target secure storage device.

In various embodiments, the recovery software or recovery device sends a transfer command to the target secure storage device. After authorizing the transfer, the target secure storage device may provide encrypted data. The recovery software or recovery device may then decrypt the encrypted data or access the decryption key with the encryption key from the authorized secure storage device.

Figure 1:
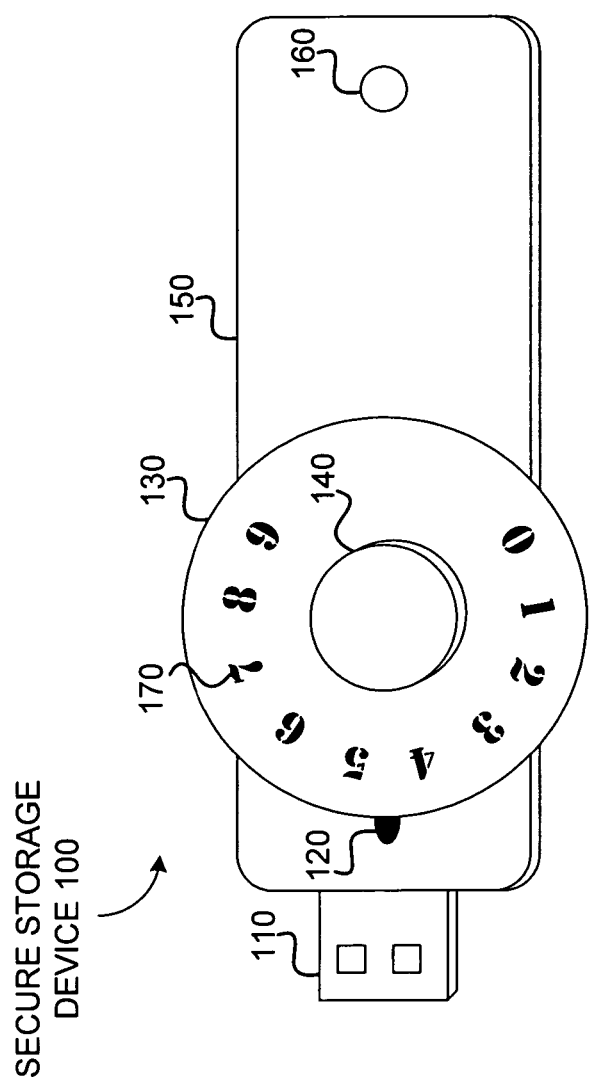
FIG. 1 depicts a secure storage device, in accordance with one embodiment of the present invention.

Referring to FIG. 1, a secure storage device 100 in accordance with one embodiment of the present invention is shown. The secure storage device 100 comprises a USB connector 110 coupled to a secure storage device housing 150. A user can turn a user input knob 140 to turn radial dial input 130 to enter the user code into the secure storage device 100. A code indicator 120 marks a code character 170 to be entered into the secure storage device 100 as a part of the user code. An authorization indicator 160 indicates when the user code has been accepted and access to the stored data on the secure storage device 100 has been authorized.

In one example, a user carries stored data within the secure storage device 100. Prior to operationally coupling the secure storage device 100 into a digital device's USB port, the user enters the user code into the secure storage device 100 by turning the user input knob 140 to turn the radial dial input 130 so that one or more code characters 170 are lined up with the code indicator 120. After the correct user code has been entered, the authorization indicator 160 can illuminate or otherwise indicate that access to the stored data has been authorized. The user may then proceed to plug the secure storage device 100 into the digital device to access the stored data.

The user code can be a unique set of characters that may contain a variety of characters (alphanumeric, numeric, symbols, or special characters). In other embodiments, the user code can comprise a user identifier such as a fingerprint, voice identifier, or retina scan. Entering the user code offline comprises the user entering the user code into the secure storage device before the secure storage device is operationally coupled with a digital device. To be operationally coupled, the secure storage device is coupled with a digital device and is enabled to receive commands and/or data from the digital device. A digital device is any device with a processor capable of sending or receiving data (e.g., a computer, laptop, personal digital assistant, and cell phone). The digital device is further described in FIG. 7.

If the user fails to enter the correct user code but plugs the secure storage device 100 into the digital device, the digital device may fail to recognize the secure storage device 100, fail to mount the digital media within the secure storage device 100, fail to execute the device driver for the secure storage device 100, and/or be unable to access the stored data.

In various embodiments, the user can turn the turn the user input knob 140 to align the code character 170 on the radial dial input 130 with the code indicator 120 and the enter the code character 170 into the secure storage device 100. In one example, he user depresses the user input knob 140 to enter the code character 170 aligned with the code indicator 120. In another example, the user depresses a button (not depicted) to enter the code character 170 into the user code. In some embodiments, there is a switch or button that locks the secure storage device 100 to prevent the user from inputting a user code or code character 170 unintentionally (e.g., while the user is carrying the secure storage device 100 in a pocket).

The USB connector 110 can be coupled to any USB port of the digital device. Although a USB connector 110 is depicted in FIG. 1, the secure storage device 100 is not limited to a USB type connector. In some embodiments, the secure storage device 100 can be coupled to the digital device through a firewire port, Ethernet connector, serial port, parallel port, SCSI port, or ATA connector. Further, the secure storage device 100 can operationally couple wirelessly to the digital device over 802.11 a/b/g/n standards, Bluetooth, or wireless USB. It is apparent to those skilled in the art that the secure storage device 100 can be operationally coupled to the digital device in many ways.

In various embodiments, the secure storage device 100 can be physically or wirelessly coupled to the digital device but the connection is not operational until the user code is entered into the secure storage device 100. In one example, the secure storage device 100 comprises the USB connector 110 couple to the digital device. Until the user code is entered into the secure storage device 100, the digital device may not recognize the secure storage device 100, load the device driver for the secure storage device 100, or mount the media contained within the secure storage device 100.

The storage device housing 150 may contain any type of data storage medium or storage system as well as a power source. The data storage medium (not depicted) may comprise flash memory (e.g., NAND flash or NOR flash memory), a hard drive, ram disk, or any other kind of data storage. A storage system (further described in FIG. 6) can comprise the data storage medium. The power source (not depicted) can be a rechargeable battery, a replaceable battery (e.g., AA), or a capacitor. In some embodiments, the battery or capacitor can be recharged by the digital device through the USB connector 110 (or any connector that couples the secure storage device 100 to the digital device).

Similarly, although the user code input is facilitated by the radial dial input 130, the user input knob 140, and the code indicator 120 in FIG. 1, it is apparent to those skilled in the art that the user code can be input into the secure storage device 100 in many ways. In one example, the secure storage device 100 comprises a keypad with which the user can press keys to enter the user code. In another example, the secure storage device 100 comprises a biometric sensor which can receive the voice, fingerprint, or retina scan of the user as the user code.

The authorization indicator 160 displays an indicator when the user code has been accepted and that access to the stored data is authorized. The authorization indicator 160 can comprise a light emitting diode (LED) that emits a light to indicate that the user code has been accepted. In some embodiments, the authorization indicator 160 can generate a light of a first color to indicate user code acceptance (e.g., green) and a second color to indicate that the user code has been rejected (e.g., red). The authorization indicator 160 may comprise multiple LEDs to indicate user code acceptance, rejection, or lockout of the secure storage device 100 (further discussed in FIG. 5). An authorization lockout may be triggered if one or more incorrect user codes are received. An authorization lockout locks the secure storage device 100 so that the secure storage device 100 will refuse to accept any user codes until reset. In other embodiments, a sound may be generated by the secure storage device 100 to indicate that the user code has been accepted or rejected.

Although the secure storage device 100 in FIG. 1 describes a user code that may be entered through the rotary dial 130 to access stored data, the user code, and rotary dial 130 are optional. In various embodiments, the secure storage device 100 may not require a user code.

Figure 2:
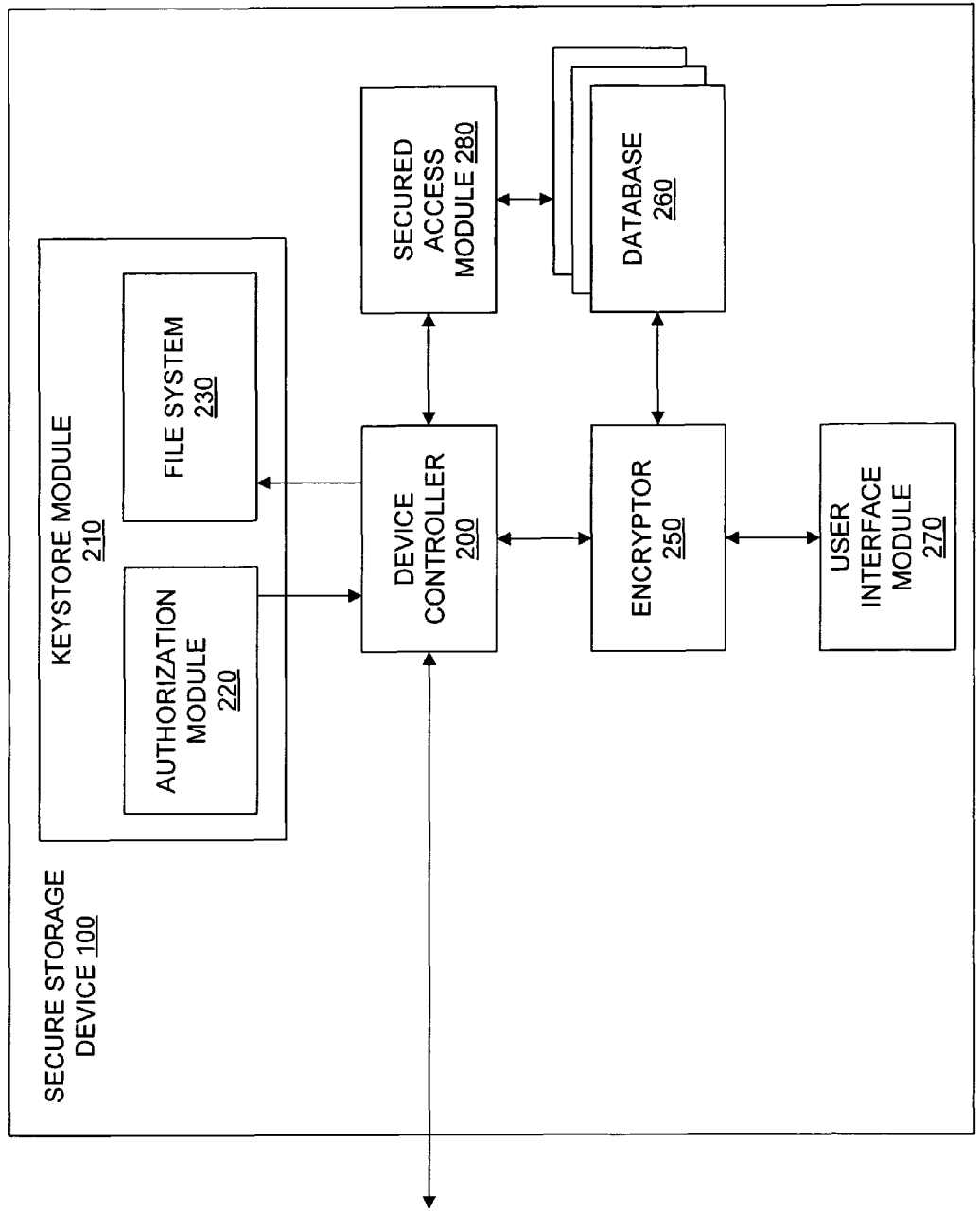
FIG. 2 depicts a block diagram of the secure storage device, in accordance with one embodiment of the present invention.

FIG. 2 is a block diagram of a secure storage device 100, in accordance with one embodiment of the present invention. The secure storage device 100 comprises a device controller 200 coupled to a keystore module 210, an encryptor 250, and a secure access module 280. The keystore module 210 comprises an authorization module 220 and a file system 230. The encryptor 250 is further coupled to database 260 and a user interface module 270. The secure access module 280 is also coupled to the database 260.

The device controller 200 can comprise the device driver for the secure storage device 100. The device controller 200 controls the communication with the digital device (not depicted) as well as the operations within the secure storage device 100. In some embodiments, the device controller 200 can control a processor or circuitry within the secure storage device 100.

In various embodiments, the device controller 200 receives an identification query from a digital device requesting the type of device of the secure storage device 100. If authorized, the device controller 200 can respond by transmitting a signal to the digital device identifying the secure storage device 100 and allowing any digital media to be mounted within the operating system of the digital device. If not authorized, the device controller 200 may refuse to respond or reject the digital device's attempts to mount the digital media.

In other embodiments, the device controller 200 receives the identification query from the digital device and identifies the secure storage device 100 as a compact disc (CD). The digital device may then attempt to automatically run an authorization check program from the device controller 200. This feature is similar to automatically playing the first song on an audio CD upon loading of the CD. The authorization check program can determine if access to the stored data is authorized. If access to stored data is not authorized, the authorization check program may terminate or the transmission of data between the digital device and the secure storage device 100 may terminate. Further, the device controller 200 may refuse to allow the digital device access to the database 260 and/or refuse to allow the digital media to be mounted.

The device controller 200 may also control the authorization indicator 160 (FIG. 1) based on an authorization indicator signal from the authorization module 220. In one example, if access to the stored data is authorized, the device controller 200 may send a signal to the authorization indicator 160 to illuminate an LED or generate a sound to indicate that access to the stored data is authorized. The device controller 200 can also generate a signal to the authorization indicator 160 to illuminate an LED or generate a sound to indicate that authorization is denied or that the secure storage device 100 is locked.

The keystore module 210 authorizes access to the stored data within the database 260. The keystore module 210 comprises the authorization module 220 and optionally a file system 230. In some embodiments, the keystore module 210 also comprises one or more authentication passwords to authorize access to the stored data. In other embodiments, the one or more authentication passwords are within the file system 230. An authentication password is a password, code, or key retained the secure storage device 100 to authenticate the user code.

The authorization module 220 receives the user code or a security code (discussed herein) and determines if the user is authorized to access the stored data. In exemplary embodiments, the authorization module 220 determines if the user is authorized to access the stored data based on the user code (or the security code) and the one or more authentication passwords. In one example, the authorization module decrypts an authentication password with user code (or security code). If the decrypted authentication password is correct, then the user may be authorized to access the stored data. If the user is authorized to access the stored data, the authorization module 220 may transmit an authorization signal to the device controller 200 to authorize access. If the user is not authorized, the authorization module 220 may refuse to respond to subsequent attempts to access the data (e.g., locking the secure storage device 100).

In some embodiments, the secure storage device 100 does not comprise authentication passwords. As a result, the authorization module 220 can base the authorization determination on the user code. Those skilled in the art will appreciate that there may be many methods in which the authorization module 220 determine authorization to access the stored data based, at least in part, on the user code or security code.

The file system 230 can maintain a list of one or more authentication passwords and/or the file system of the database 260. In various embodiments, the file system 230 can associate each authentication password with a different partition within the digital media. As a result, separate user codes may access different partitions within the digital media. In one example, a first user code entered by a user may authorize access to a partition with data used at the user's home. A second user code may authorize access to a partition with business data. As a result, a single secure storage device 100 may be shared with co-workers or others which may be allowed to access some, but not all, of the stored data retained within the secure storage device 100. In other embodiments, the file system 230 can maintain a list of one or more user codes associated with the different partitions within the digital media.

Further, in some embodiments, the file system 230 maintains the scrambled database file system of the database 260. The database file system is a map of the stored data retained within the database 260. Without the database file system, the digital device may not be able to identify stored data contained within the database 260. By separating the database file system from the database 260, a thief who removes the database 260 from the secure storage device 100 may fail to steal the database file system. Further, the database file system may be scrambled. The authorization module 220 can unscramble the database file system within the file system 230 or the database 260 when access to the stored data is authorized.

The encryptor 250 functions to encrypt or decrypt security codes, stored data within the database 260, or the file system 230. In exemplary embodiments, the stored data within the database 260 is encrypted. If access to stored data is authorized, the encryptor 250 encrypts data transmitted from the digital device prior to storage within the database 260. Further, as stored data is requested from the database 260, the encryptor 250 can decrypt the stored data prior to transmission of the stored data to the digital device. As a result, the stored data within the database 260 may always be encrypted.

The encryptor 250 can also decrypt the security code using the user code prior to authorization. When the security code is decrypted, the security code may be sent to the authorization module 220 where it may be compared to the one or more authentication passwords within the keystore module 210. In some embodiments, the database 260 and the keystore module 210 are retained on separate chips within the secure storage device 100.

The database 260 can comprise one more databases or other data structures of stored data. Further, the database 260 may be partitioned thereby allowing data to be stored in different partitions. In one example, personal data and work data may be stored in separate partitions. Each partition may be accessed by a different user code. The database 260 may be contained within a storage system. The storage system is further discussed in FIG. 7.

The user interface module 270 controls the user interface (e.g., the radial dial input 130 IN FIG. 1) and receives the user code. In exemplary embodiments, the user interface module 270 receives the user code from the user. In some embodiments, the user interface module 270 sends the user code to the encryptor 250 to decrypt the user code. In other embodiments, the user interface module 270 sends the user code to the encryptor 250 to decrypt a security code. The security code may be used to authorize access to the stored data.

The secure access module 280 is configured to receive a transfer command, authorize the transfer command, and control the transfer of encrypted data from the database 260 to a digital device (not depicted.) In exemplary embodiments, the secure access module 280 receives the transfer command from a recovery module (further discussed in FIG. 3) within the digital device. The secure access module 280 may confirm the authority of the transfer command. If the authority of the transfer command is confirmed, then the secure access module 280 may transmit some or all of the encrypted data stored within the database 260 to the digital device. This process is further discussed in FIG. 5.

Figure 3:
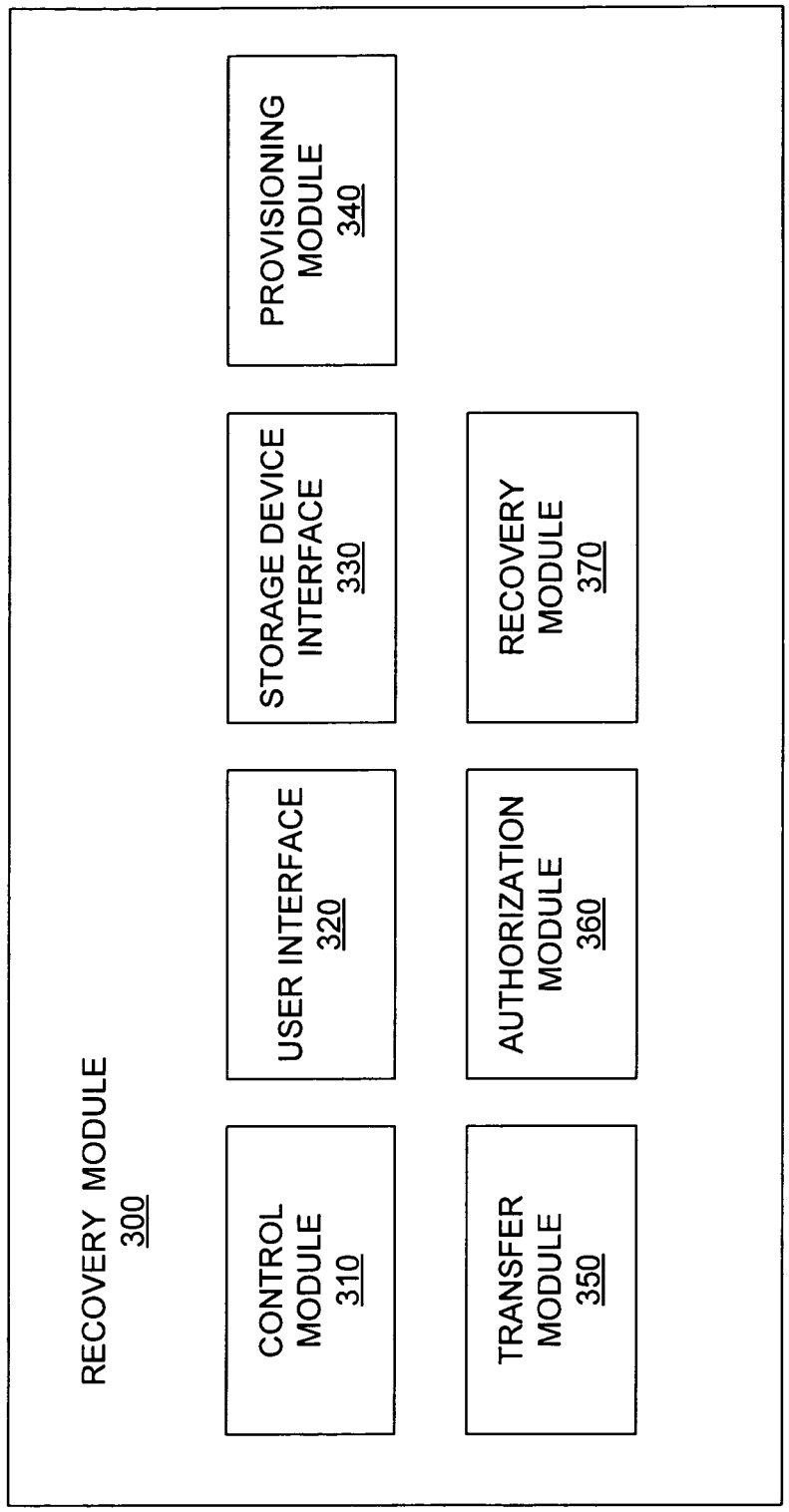
FIG. 3 depicts a block diagram of a recovery module, in accordance with one embodiment of the present invention.

FIG. 3 depicts a block diagram of a recovery module 300, in accordance with one embodiment of the present invention. The recovery module 300 may be software or a digital device configured to assist an authorized user to access and decrypt data from a target secure storage device 100 (FIG. 1). The recovery module 300 comprises a control module 310, a user interface 320, a storage device interface 330, a provisioning module 340, a transfer module 350, an authorization module 360, and a recovery module 370.

The control module 310 is configured to control and coordinate the various components of the recovery module 300. In some embodiments, the control module 310 can control a processor or circuitry within the recovery module 300.

The user interface 320 is configured to allow the authorized user to interact with the recovery module 300. In some embodiments, the user interface 320 is a graphical user interface. When the recovery module 300 is activated, the control module 310 may configure the user interface 320 to display a request for a username and password from the authorized user of the recovery module 300 before granting access to the recovery module 300. The password may comprise a public encryption key. In some embodiments, the control module 310 may also require that the recovery module 300 have access to an authorized secure storage device 100 and/or authenticate an authorized private encryption key stored within the authorized secure storage device 100 before granting access.

The storage device interface 330 is configured to control the communication with a digital device (not depicted), the recovery module 300, and one or more secure storage devices 100. In one example, the storage device interface 330 controls two USB ports. A target secure storage device 100 and an authorized secure storage device 100 may be simultaneously operationally coupled to the two USB ports. The storage device interface 330 may communicate with any number of secure storage devices 100.

The provisioning module 340 can control the provisioning of secure storage devices 100. The provisioning process in the process whereby one or more secure storage devices 100 may be configured to authorize a transfer command, transmit encrypted data based on the authorization of the transfer command and/or store a decryption key capable of decrypting the encrypted data stored within the database 260 (FIG. 2).

In one example, the authorized user has access to an authorized public encryption key and an authorized private encryption key. The authorized user may wish to be able to access secure storage device 100 without the requirement of the user code. In one example, the authorized secure storage device 100 is owned by a CIO or CEO of a company while the target secure storage device 100 is to be issued to an employee.

The authorized user may provision a secure storage device 100 such that the secure storage device 100 will store encrypted data that may be decrypted with the aid of the authorized private encryption key. The authorized public encryption key may be used to digitally sign a transfer command to safely command the secure storage device 100 to transmit stored data to a digital device.

A digital device (not depicted) may comprise the recovery module 300. An authorized user may couple an authorized secure storage device 100 and a target secure storage device 100 to the digital device. The authorized secure storage device 100 further comprises an authorized private encryption key.

In exemplary embodiments, the authorized user may activate the recovery module 300 and request to provision the target secure storage device 100. The control module 310 may direct the user interface 320 to display a request to the authorized user for a public encryption key. The provisioning module 340 directs the target secure storage device 100 to accept a transfer command digitally signed with the public encryption key. The transfer command may be sent from the transfer module 350 discussed herein.

The provisioning module 340 may then generate a decryption key that can decrypt the data stored on the target secure storage device 100. The provisioning module 340 may encrypt the decryption key with the authorized private encryption key stored on the authorized secure storage device 100. The provisioning module 340 may store the encrypted decryption key with the stored data within the database 260 of the target secure storage device 100.

Although provisioning is discussed with regard to one authorized secure storage device 100, one authorized public encryption key, and one authorized private encryption key, any number of authorized secure storage devices 100, authorized public encryption keys, and authorized private encryption keys may be required to access and decrypt the stored data within the target secure storage device 100.

In various embodiments, multiple authorized secure storage device 100 owned by different authorized users may be required in order to enhance security and increase accountability. In one example, the CEO and CIO of a company each have a different authorized secure storage device 100 (i.e., the CEO secure storage device 100 and the CIO secure storage device 100.) The target secure storage device 100 may require a transfer command that is digitally signed by an authorized public encryption key from the CEO and/or CIO. Further, in some embodiments, the decryption key may be decrypted by the authorized private encryption key from both the CEO secure storage device 100 and the CIO secure storage device 100. The process of decrypting the data stored within the target secure storage device 100 is further discussed herein.

The provisioning module 340 may configure the target secure storage device 100 to require a specific password or biometric identifier before accepting a transfer command or providing access to encrypted data. A biometric identifier is an identifier that may personally identify the authorized user or any user of the target secure storage device 100. In some examples, the biometric identifier is a fingerprint, voiceprint, or retina scan. The provisioning module 340 may grant the authorized user the option of configuring the target secure storage device 100 to require a password or biometric identifier prior to allowing access.

In exemplary embodiments, the provisioning module 340 may store a verification encryption key within the target secure storage device 100. A verification encryption key is an encryption key that may be used to confirm, authenticate, and/or verify a transfer request and/or an authorization request response. The transfer request and the authorization request response are further discussed in FIG. 4.

The transfer module 350 is configured to generate a transfer command to sent to the target secure storage device 100 in order to command the target secure storage device 100 to provide encrypted data stored within the database 260. In some embodiments, the transfer command may be digitally signed by an authorized public encryption key from the user interface 320 or an authorized private encryption key from an authorized secure storage device 100.

The authorization module 360 is configured to receive an authorization request from the secure storage device 100 and provide a response. In various embodiments, the authorization request is a request for authorization that is sent by the secure storage device 100 in response to receiving a transfer command. The authorization request may comprise a request for an authorization code or encrypted data.

The authorization module 360 can respond to the authorization request by providing an authorization code or encrypted data to the target secure storage device 100. In one example, the authorization module 360 may provide the authorization code comprising an authorized public encryption key from the user interface 320 or the authorized private encryption key from the storage device interface 330. In another example, the authorization module 360 may encrypt at least some of the authorization request with the authorized public encryption key or the authorized private encryption key. The encrypted data may then be sent to the target secure storage device 100.

The secure access module 280 (FIG. 2) of the secure storage device 100 may authenticate the response from the authorization module. In some embodiments, the secure access module 280 compares the authorization code to code within the database 260 to authenticate the authorization code. In various embodiments, the secure access module 280 may decrypt the encrypted data within the response from the recovery module 300 and compare the decrypted data to data within the database 260 to authenticate the encrypted data. If the response to the authorization request is authenticated, the target secure storage device 100 may download encrypted data from within the database 260 to the digital device.

The recovery module 370 is configured to decrypt encrypted data from the secure storage device 100. The data stored within each secure storage device 100 may be encrypted. When the data is downloaded from the secure storage device 100 in response, at least in part, to a transfer command, the data may still be encrypted. In various embodiments, a decryption key is encrypted along with the encrypted data.

The recovery module 370 may retrieve one or more authorized private encryption keys to decrypt the decryption key. After the decryption key is decrypted, the decryption key may subsequently be used by the recovery module 370 to decrypt the download encrypted data. In exemplary embodiments, the recovery module 370 may decrypt the decryption key with a plurality of authorized private encryption keys from a plurality of authorized secure storage devices 100.

Figure 4:
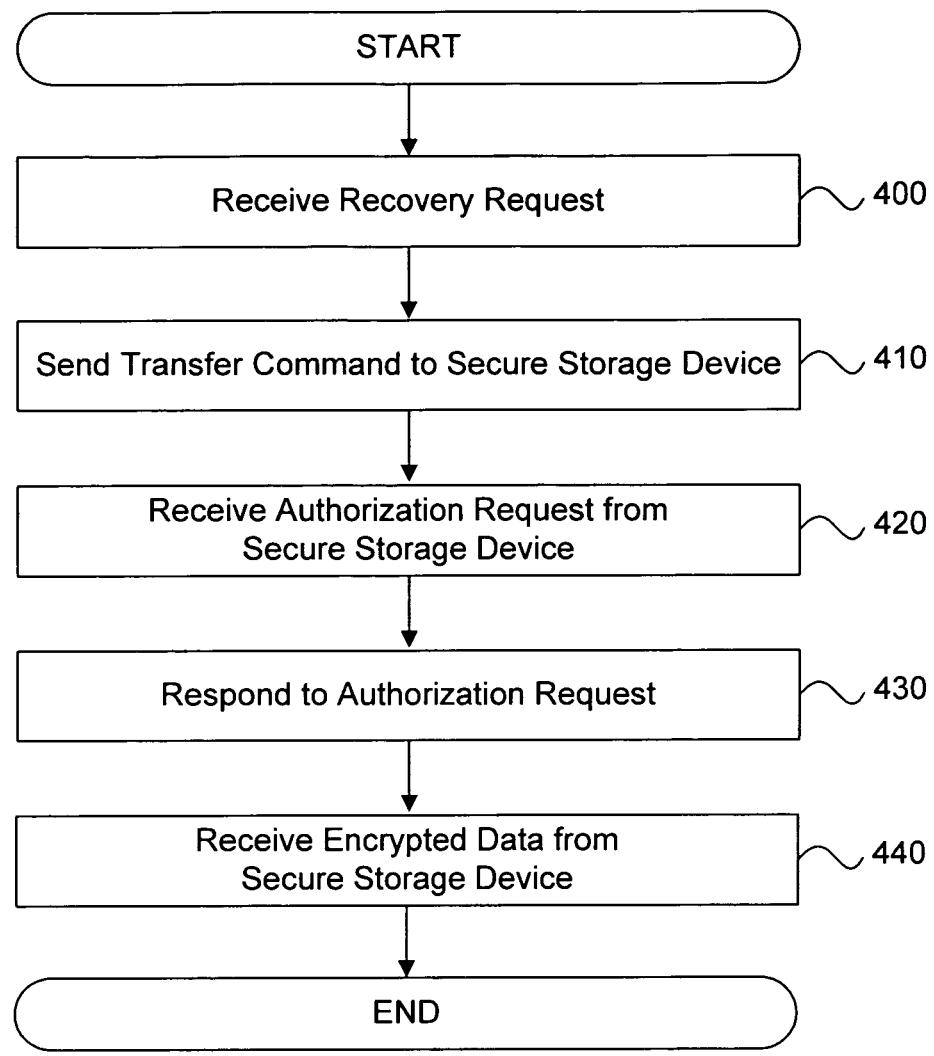
FIG. 4 is a flow chart for receiving encrypted data from the secure storage device, in accordance with one embodiment of the present invention.

FIG. 4 is a flow chart for receiving encrypted data from a secure storage device 100 (FIG.1), in accordance with one embodiment of the present invention. In step 400, the user interface 320 (FIG. 3) of the recovery module 300 (FIG. 3)

receives a recovery request to recover encrypted data from a target secure storage device 100. The recovery request may be input by the authorized user.

In response to the recovery request, the control module 310 may direct the transfer module 350 (FIG. 3) to send a transfer command to the target secure storage device 100 in step 410. The transfer command may be digitally signed by an authorized public encryption key or an authorized private encryption key. In some embodiments, the digitally signed transfer command is verified by the verification encryption key previously stored within the target secure storage device 100.

In some embodiments, prior to the sending of the transfer command, the recovery software 300 requests for a password or biometric identifier from the user to send to the target secure storage device 100. The password and biometric identifier are further discussed in FIG. 3. In various embodiments, the biometric identifier may be entered directly into the target secure storage device 100.

In step 420, the recovery module 300 receives an authorization request from the target secure storage device 100. In various embodiments, in response to receiving the transfer request, the target secure storage device 100 may send the authorization request to the recovery module 300. The control module 310 of the recovery module 300 may direct the storage device interface 330 (FIG. 3) to receive and provide the authorization request to the authorization module 360 (FIG. 3).

In step 430, the authorization module 360 responds to the authorization request. In exemplary embodiments, the control module 310 directs the user interface 320 to display a request for an authorization code to the authorized user. The authorization module 360 may then send the authorization code over the storage device interface 330 to the target secure storage device 100 as an authorization request response.

In other embodiments, the authorization module 360 digitally signs and sends the authorization request response to the target secure storage device 100. In one example, the authorization module 360 digitally signs the authorization response request with a public encryption key provided by the user or retrieved from the authorized secure storage device 100. In another example, the recovery module 300 digitally signs the authorization response request with a private encryption key from the authorized secure storage device 100. In some embodiments, the digitally signed authorization response is verified by the verification encryption key previously within the target secure storage device 100.

In alternate embodiments, the authorization module 360 encrypts a portion of the authorization request and sends the encrypted portion of the authorization request over the storage device interface 330 to the target secure storage device 100. In one example, the control module 310 directs the storage device interface 330 to retrieve the authorized private encryption key from another secure storage device 100. The authorization module 360 may encrypt all of a portion of the authorization request with the authorized private encryption key. The authorization module 360 may then send the encrypted response to the authorization request to the target secure storage device 100.

In step 440, the recovery module 300 receives the encrypted data from the database 260 (FIG. 2) of the target secure storage device 100. In some embodiments, the secure access module 280 (FIG. 2) of the target secure storage device 100 sends the data to the digital device that comprises the recovery module 300. Although step 440 discusses retrieving encrypted data from the target secure storage device 100, in some embodiments, unencrypted data may be retrieved from the target secure storage device 100.

In various embodiments, the target secure storage device 100 sends the encrypted data to a file or directory within the digital device. The recovery module may then decrypt the data. In other embodiments, the encrypted data is decrypted by an encryption or decryption key within the digital device.

Figure 5:
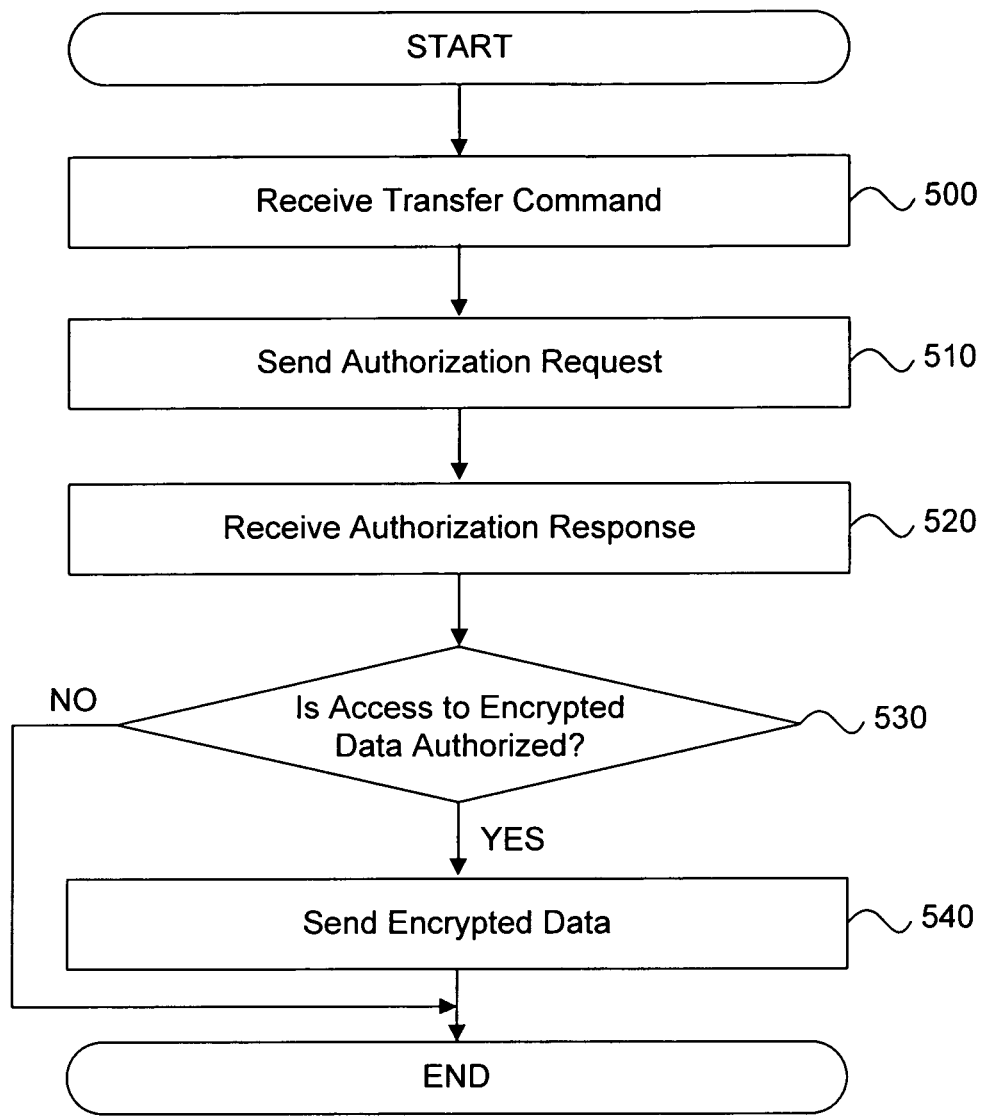
FIG. 5 is a flowchart for sending encrypted data to a recovery module, in accordance with one embodiment of the present invention.

FIG. 5 is a flowchart for sending encrypted data to the recovery module 300 (FIG. 3), in accordance with one embodiment of the present invention. In one example, the authorized user operationally couples the target secure storage device 100 FIG. 1) with the recovery module 300. However, the authorized user may not have access to the user code to unlock the target secure storage device 100. As a result, the target secure storage device 100 may not be accessed by a digital device that does not comprise the recovery module 300. Even though the target secure storage device 100 may not otherwise mount, the target secure storage device 100 may respond to the recovery module 300.

In step 500, the target secure storage device 100 receives the transfer command from the recovery module 300. In one example, the device controller 200 (FIG. 2) receives the transfer command and directs the transfer command to the secure access module 280 (FIG. 2).

In some embodiments, the transfer request is digitally signed. The secure access module 280 may verify the digital signature with data from the database 260 (FIG. 2). In one example, the device controller 200 directs data from the database 260 to be decrypted by the encryptor 250 (FIG. 2) and subsequently provided to the secure access module 280. The secure access module 280 may then verify the digital signature of the transfer command through comparison with the unencrypted data.

In step 510, the secure access module 280 may send an authorization request to the recovery module 300 before transmitting encrypted data from the database 260. The authorization request may comprise data to be encrypted by the recovery module 300. The recovery module 300 may then encrypt the data with an authorized encryption key and send the encrypted data back to the secure access module 280.

In step 520, the secure access module 280 receives the authorization response from the recovery module 300. The secure access module 280 may decrypt the data or confirm the authorized encryption key with an authentication encryption key. The authentication encryption key may be stored within the keystore module 210 (FIG. 2), the encryptor 250, the database 260, or the secure access module 280. In some embodiments, the authentication encryption key is stored within the target secure storage device 100 during provisioning (further discussed in FIG. 3.)

In step 530, the secure access module 280 determines if the authorization response is authorized or otherwise confirmed. If the authorization response does not comprise the correct code or the encrypted data was not encrypted by the correct encryption key, then FIG. 5 ends. If the secure access module 280 determines that the authorization response is authorized or otherwise confirmed, then the secure access module 280 transmits the encrypted data (step 540) to the recovery module 300 or the digital device comprising the recovery module 300.

In some embodiments, the target secure storage device 100 may download only some of the encrypted data. In one example, the transfer command can command the target secure storage device 100 to download encrypted data from a particular partition or other data structure within the database 260.

Encrypted data within the database 260 may be divided into separate partitions based on content or any other basis (i.e., encrypted data associated with work in a first partition and personal encrypted data in a second partition.) The secure access module 280 may determine what encrypted data to download from one or more partitions within the database 260 based on the transfer command and/or the authorization response.

In various embodiments, the secure access module 280 cannot retrieve or otherwise access unencrypted data from within the database 260. Similarly, in some embodiments, to further enhance security, the recovery module 300 may not direct the target secure storage device 100 to directly download unencrypted data from the database 260. In other embodiments, the secure access module 280 can access, retrieve, and provide unencrypted data from the database 260 to the recovery module 300.

Figure 6:
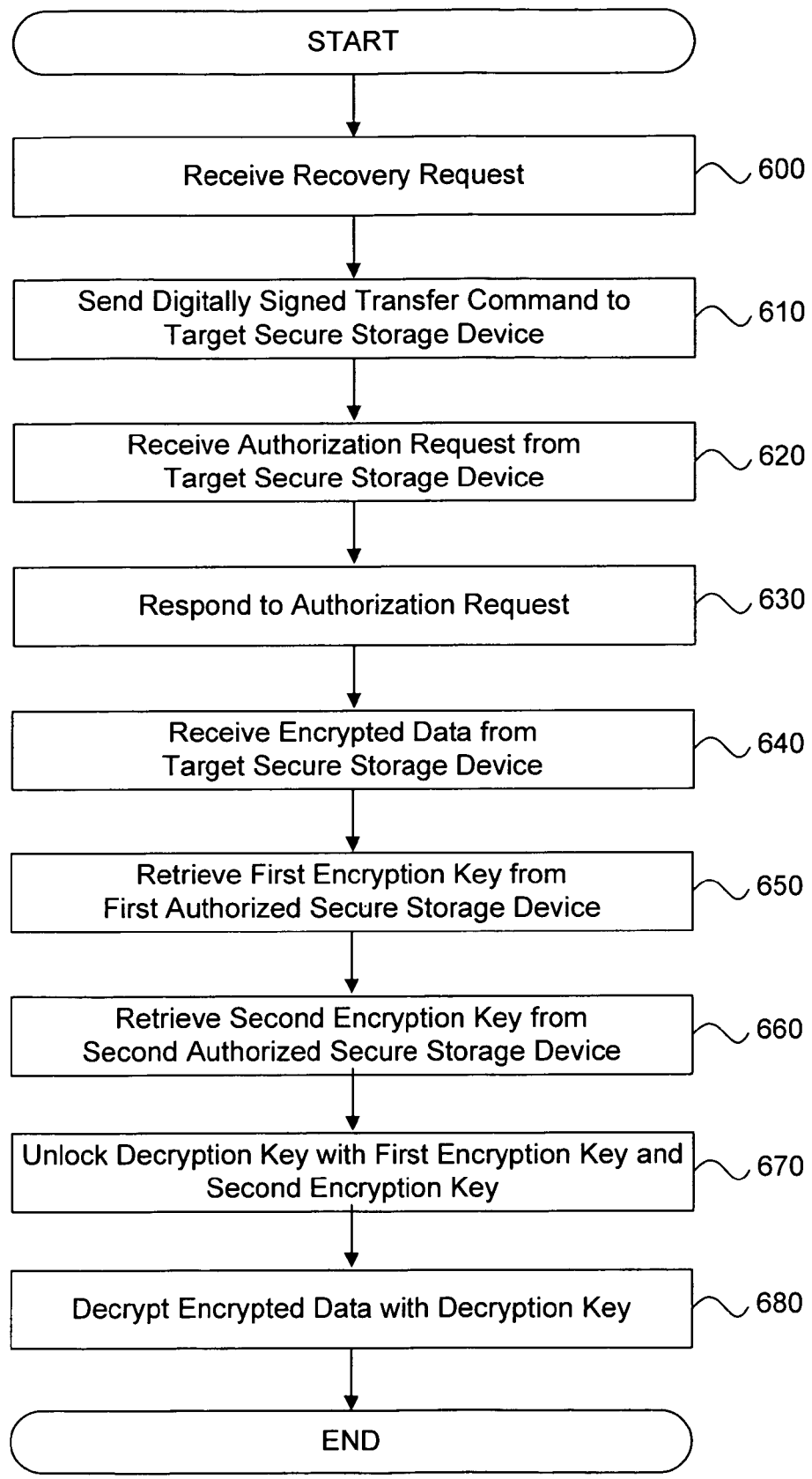
FIG. 6 is a flow chart for receiving and decrypting encrypted data from the secure storage device, in accordance with one embodiment of the present invention.

FIG. 6 is a flow chart for receiving and decrypting encrypted data from a secure storage device 100 (FIG. 1), in accordance with one embodiment of the present invention. In step 600, the recovery module 300 (FIG. 3) receives a recovery request from an authorized user. In step 610, the recovery module 300 sends a digitally signed transfer command to the target secure storage device 100. In step 620, the recovery module 300 receives an authorization request from the target secure storage device 100. The recovery module 300 responds to the authorization request in step 630.

The recovery module 300 or a digital device receives the encrypted data from the target secure storage device 100 in step 640. In various embodiments, an encrypted file comprising the encrypted data and an encrypted decryption key is received from the target secure storage device 100. The decryption key is the key that may be used to decrypt the encrypted data from the target secure storage device 100. In other embodiments, the encrypted data is in one or more files and the encrypted decryption key is in one or more other files.

In various embodiments, multiple encryption keys may be required to decrypt the decryption key. In one example, a CTO authorized encryption key decrypts the first 64 bits of a 128 bit encrypted decryption key. The next 64 bits of the 128 bit encrypted decryption key may be decrypted by a CEO authorized encryption key. Once both authorized encryption keys decrypt the decryption key, the recovery module 300 may use the decryption key to decrypt the encrypted data from the target secure storage device 100. Each encryption key may be stored within a separate secure storage device 100 (i.e., separate authorized secure storage devices 100.)

Those skilled in the art will appreciate that any number of authorized encryption keys may be necessary to decrypt the decryption key. By requiring multiple authorized encryption keys within multiple authorized secure storage devices 100, the opportunities for fraudulent or unauthorized access to the encrypted data may be greatly reduced.

In various embodiments, several combinations of authorized encryption keys may decrypt the decryption key. The decryption keys, each capable of decrypting the encrypted data, may be decrypted by different combinations of authorized encryption keys. In one example, a decryption key capable of decrypting the encrypted data may be decrypted by any two authorized encryption keys from a set of five authorized encryption keys.

In a further example, the encrypted data from a target secure storage device 100 may be decrypted by one of several encrypted decryption keys. Authorized encryption keys may be stored within separate authorized secure storage device 100 including a CTO secure storage device 100, a CEO secure storage device 100, a CIO secure storage device 100, a security secure storage device 100, and a failsafe secure storage device 100. At least one decryption key may be decrypted by any two of the five authorized encryption keys. Those skilled in the art will appreciate that any combination of authorized encryption keys may be provisioned and/used to decrypt the decryption keys.

In step 650, the recovery module 300 retrieves the first authorized encryption key from the first authorized secure storage device 100. In one example, the control module 310 (FIG. 3) directs the storage device interface 330 (FIG. 3) to retrieve the first authorized encryption key (e.g., the first authorized private encryption key) from the first authorized secure storage device 100. In some embodiments, the control module 310 directs the recovery module 370 (FIG. 3) to decrypt all or some of the decryption key with the first encryption key.

In step 660, the recovery module 300 retrieves the second authorized encryption key from the second authorized secure storage device 100. In one example, the control module 310 configures the storage device interface 330 to retrieve the second authorized encryption key (e.g., the second authorized private encryption key.) The control module 310 directs the recovery module 370 to decrypt all or some of the decryption key with the first encryption key and the second encryption key in step 670.

In some embodiments, each authorized secure storage device 100 may require a key request from the recovery module 300 before allowing access to the encryption key. In one example, the recovery module 300 sends a different public encryption key (e.g., a digitally signed key request) that may be recognized by one or more authorized secure storage device 100. If the key request is recognized or otherwise authenticated, the authorized secure storage device 100 may allow access to the authorized encryption key.

In step 680, the recovery module 300 decrypts the encrypted data from the target secure storage device 100 with the decryption key. In one example, the recovery module 370 decrypts the encrypted data with the decryption key.

Figure 7:
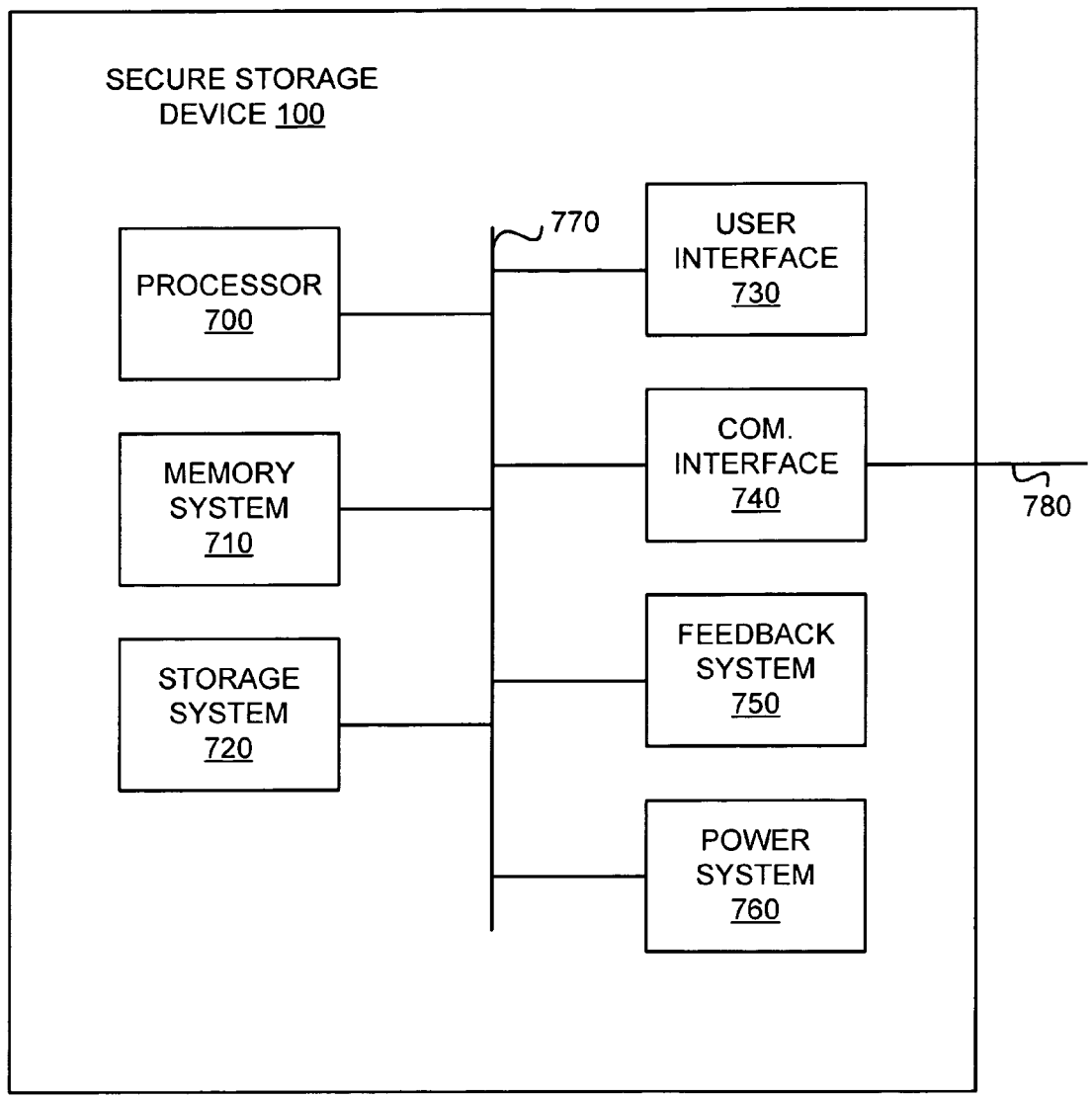
FIG. 7 depicts the secure storage device, in accordance with one embodiment of the present invention.

FIG. 7 is a block diagram of the secure storage device 100 in an exemplary implementation of the invention. The secure storage device 100 comprises a processor 700, an optional memory system 710, a storage system 720, a user interface 730, a communication interface 740, feedback system 750, and a power system 760 which are all coupled to a system bus 770. The processor 700 is configured to execute executable instructions. In some embodiments, the processor 700 comprises circuitry or any processor capable of processing the executable instructions.

The memory system 710 is any memory configured to store data. Some examples of the memory system 710 are storage devices, such as RAM or ROM.

The storage system 720 is any storage configured to retrieve and store data. Some examples of the storage system 720 are flash drives, hard drives, optical drives, and/or magnetic tape. The storage system 720 can comprise a database 260 (FIG. 2) or other data structure configured to hold and organize data. In some embodiments, the secure storage device 100 includes the memory system 710 in the form of RAM and the storage system 720 in the form of flash data.

The user interface 730 is any device that can receive a user code. The user interface 730 can be, but is not limited to, a radial dial, keypad, or biosensor.

The communication interface 740 can be coupled to any digital device via the link 780. As discussed in FIG. 1, the communication interface 740 may support communication over a USB connection, a firewire connection, an Ethernet connection, a serial connection, a parallel connection, or an ATA connection. The communication interface 740 may also support wireless communication (e.g., 802.11 a/b/g/n or wireless USB). It will be apparent to those skilled in the art that the communication interface 740 can support many wired and wireless standards.

The feedback system 750 is any indicator that signals the user that access to the stored data within the secure storage device 100 is authorized. In some examples, the feedback system 750 can be an LED light or sound. The feedback system 750 may also indicate that access to the stored data is not authorized or that the secure storage device 100 is locked.

The optional power system 760 is any system that can provide power to the secure storage device. The power system 760 can supply power to the secure storage device 100 to receive the user code and authorize access to the stored data. In one example, the power system 760 comprises a rechargeable battery, a replaceable battery, or a capacitor. The batteries or capacitor may be recharged with a power recharger or from power received from the digital device. In some embodiments, the power system 760 is optional, and the user code can be passively received. Once the secure storage device 100 is coupled to the digital device, power can be received from the digital device and the authorization process completed.

In some embodiments, the power system 760 supplies power to the processor 700 when the secure storage device 100 is not coupled to a digital device. In one example, the power system 760 supplies power to the processor 700 during the process of receiving the user code and authorization. Once the secure storage device 100 is coupled to the digital device, the digital device may supply power to the secure storage device.

Figure 8:
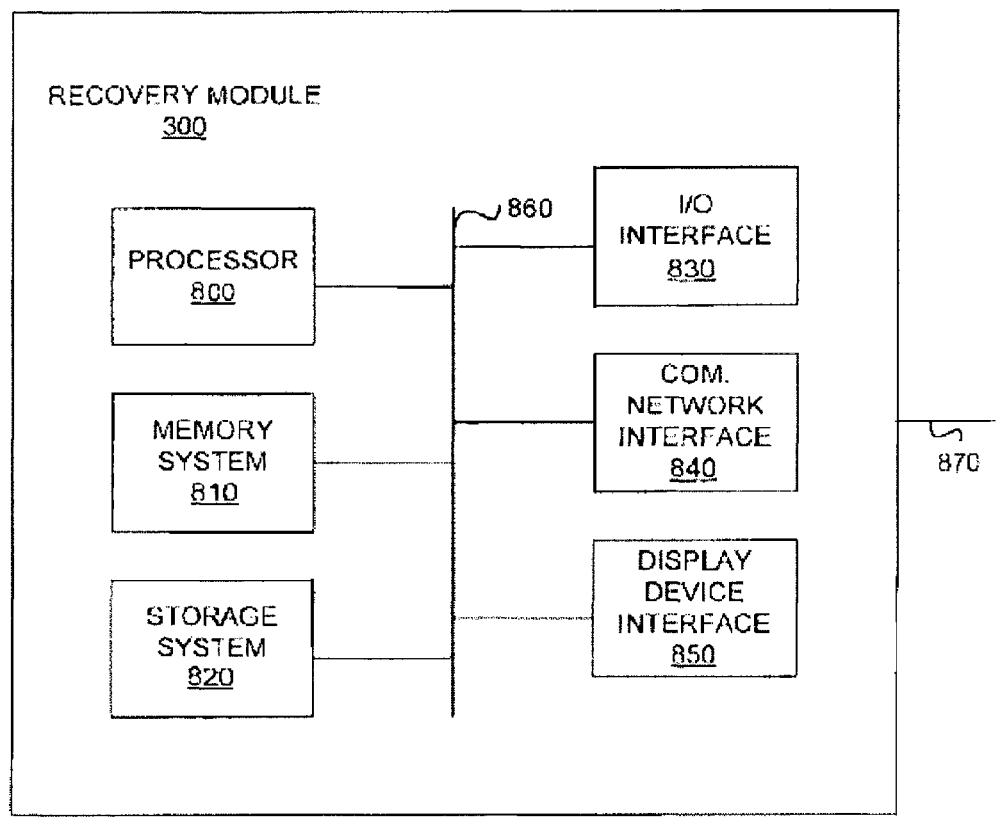
FIG. 8 is a block diagram of the recovery module in an exemplary implementation of the invention.

FIG. 8 is a block diagram of the recovery module 300 (FIG. 3) in an exemplary implementation of the invention. The recovery module 300 comprises a processor 800, a memory system 810, a storage system 820, an input/output ("I/O") interface 830, a communication network interface 840, and a display interface 850 which are all coupled to a system bus 860. The processor 800 is configured to execute executable instructions. In some embodiments, the processor 800 comprises circuitry or any processor capable of processing the executable instructions. In some embodiments, the recovery module 300 comprises a digital device.

The memory system 810 is any memory configured to store data. Some examples of the memory system 810 are storage devices, such as RAM or ROM. The storage system 820 is any storage configured to retrieve and store data. Some examples of the storage system 820 are flash drives, hard drives, optical drives, and/or magnetic tape. The storage system 820 can comprise a database or other data structure configured to hold and organize data. In some embodiments, the recovery module 300 includes the memory system 810 in the form of RAM and the storage system 820 in the form of flash data.

The I/O interface 830 is any device that can receive input from the one or more secure storage devices 100 (FIG. 1). The I/O interface 830 can also couple to a keyboard, touchscreen, mouse, keypad, printer, scanner, or any other input or output device.

The communication network interface 840 can be coupled to any network or secure storage device 100 via the link 870. Moreover, the communication network interface 840 may support communication over many kind of connections, including, but not limited to, a USB connection, a firewire connection, an Ethernet connection, a serial connection, a parallel connection, an ATA connection. The communication network interface 840 may also support wireless communication (e.g., 802.11 a/b/g/n or wireless USB). It will be apparent to those skilled in the art that the communication network interface 840 can support many wired and wireless standards.

The display interface 850 is any device that can control a display device. A display device can be a monitor, screen, LCD, flatscreen, or any device configured to display information.

The above-described functions can be comprised of executable instructions that are stored on storage media. The executable instructions can be retrieved and executed by the processor 800 (FIG. 8) of the recovery module 300 (FIG. 3) and/or the processor 700 (FIG. 7) of the secure storage device 100 (FIG. 1). Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for recovering encrypted data from a target portable secure storage device having a user interface for receiving a user code to access the encrypted data, the method comprising:

coupling the target portable secure storage device to a recovery module;

receiving a recovery request to recover the encrypted data when the user code is unavailable from the user interface;

sending a transfer command to the target portable secure storage device;

receiving an authorization request from the target portable secure storage device in response to the transfer command;

responding to the authorization request with an authorization response;

authenticating the authorization response without verifying the user code;

receiving the encrypted data from the target portable secure storage device;

coupling a plurality of authorized secure storage devices to the recovery module;

retrieving a plurality of encryption keys from the plurality of authorized secure storage devices;

unlocking a decryption key with the plurality of encryption keys; and decrypting the encrypted data with the decryption key.

2. The method of claim 1, further comprising:

coupling an authorized secure storage device to the recovery module;

retrieving an encryption key from an the authorized secure storage device; and decrypting the encrypted data with, at least in part, the encryption key.

3. The method of claim 1, wherein the transfer command is digitally signed.

4. The method of claim 1, wherein responding to the authorization request comprises:
digitally signing at least a part of an authorization request response with an encryption key from an authorized secure storage device coupled to the recovery module; and
sending the digitally signed authorization request response to the target portable secure storage device.

5. The method of claim 1, wherein responding to the authorization request comprises:
decrypting at least a part of the authorization request with an encryption key from an authorized secure storage device coupled to the recovery module; and
sending the encrypted authorization request to the target portable secure storage device.

6. The method of claim 1, wherein the encrypted data is stored within a single data partition within the target portable secure storage device.

7. The method of claim 1, wherein the encrypted data from the target portable secure storage device is recovered from at least one data partition within the target portable secure storage device and the at least one data partition is determined by the authorization response.

8. The method of claim 1, further comprising transmitting an authentication identifier to the target portable secure storage device.

9. The method of claim 8, wherein the authentication identifier is a password or a biometric identifier.

10. The method of claim 1, further comprising storing a verification encryption key on the target portable secure storage device.

11. The method of claim 10, wherein the verification encryption key can verify the transfer request or can verify an authorization request response.

12. The method of claim 1, further comprising storing an encrypted decryption key within the target portable secure storage device.

13. The method of claim 12, wherein the encrypted decryption key may be decrypted by one or more public encryption keys.

14. A system comprising:
a portable secure storage device having a user interface for receiving a user code to access data on the portable secure storage device; and
a recovery module for accessing the data when the user code is unavailable, the recovery module comprising:
a communication interface configured to couple with the portable secure storage device; and
a processor connected to the communication interface, the processor configured to:
receive a recovery request to recover the data;
send a transfer command to the portable secure storage device;
receive an authorization request from the portable secure storage device in response to the transfer command;
respond to the authorization request by providing an authorization response to the portable secure storage device;
receive the data from the portable secure storage device based on authentication of the authorization response without verifying the user code;
retrieve a plurality of encryption keys from a plurality of authorized secure storage devices coupled to the communication interface;
unlock a decryption key with the plurality of encryption keys; and
decrypt the encrypted data with the decryption key.

15. The system of claim 14, wherein the processor is further configured to:
retrieve an encryption key from an authorized secure storage device coupled to the communication interface; and
decrypt the data with the encryption key.

16. A non-transitory computer readable storage medium having a program embodied thereon, the program executable by the processor to perform a method for recovering data from a target portable secure storage device having a user interface for receiving a user code to access the data, the method comprising:
receiving a recovery request to recover the data when the user code is unavailable from the user interface;
sending a transfer command to the target portable secure storage device;
receiving an authorization request from the target portable secure storage device in response to the transfer command;
responding to the authorization request by sending an authorization response from the recovery module to the target portable secure storage device, wherein the authorization response is authenticated without verifying the user code;
receiving the encrypted data from the target portable secure storage device,
coupling a plurality of authorized secure storage devices to the recovery module;
retrieving a plurality of encryption keys from the plurality of authorized secure storage devices;
unlocking a decryption key with the plurality of authorized secure storage devices;
unlocking a decryption key with the plurality of encryption keys; and
decrypting the encrypted data with the decryption key.

17. The system of claim 14, wherein the authorization response is authenticated by comparing to a database on the portable secure storage device.

18. The system of claim 14, wherein the transfer command is digitally signed by a public encryption key from a user of the recovery module.

19. The system of claim 18, wherein the digitally signed transfer command is verified by a verification encryption key stored within the portable secure storage device.

20. The system of claim 15, wherein the portable secure storage device and the authorized secure storage device are simultaneously coupled to the communication interface.

21. The system of claim 20, wherein the transfer command is digitally signed by a private encryption key from the authorized secure storage device.

22. The system of claim 20, wherein the authorization response is digitally signed by a private encryption key from the authorized secure storage device.

23. The system of claim 22, wherein the digitally signed authorization response is verified by a verification encryption key stored within the portable secure storage device.

24. The system of claim 15, wherein the portable secure storage device and the plurality of authorized secure storage devices are simultaneously coupled to the communication interface.

25. The system of claim 14, wherein the user interface comprises means for receiving a user code comprising a password.

26. The system of claim 25, wherein the recovery module is configured to send an authentication identifier comprising the password to the portable secure storage device.

27. The system of claim 14, wherein the user interface comprises means for receiving a user code comprising a voice, fingerprint, or retina scan.

28. The system of claim 27, wherein the recovery module is configured to send an authentication identifier comprising the voice, fingerprint or retina scan to the portable secure storage device.

29. The system of claim 14, wherein the portable secure storage device comprises a flash memory device.

30. The system of claim 29, wherein the communication interface comprises a USB port for coupling to the flash memory device.

31. The computer readable storage medium of claim 16, wherein the program is executable by the processor to perform a method comprising digitally signing the transfer command with a public encryption key.

32. The computer readable storage medium of claim 16, wherein the program is executable by the processor to perform a method comprising digitally signing the transfer request with a private encryption key from an authorized secure storage device operationally coupled to the recovery module.

33. The computer readable storage medium of claim 16, wherein the program is executable by the processor to perform a method comprising digitally signing the authorization response with a private encryption key from an authorized secure storage device operationally coupled to the recovery module.

* * * * *

UNITED STATES PATENT AND TRADEMARK OFFICE
CERTIFICATE OF CORRECTION

PATENT NO.        : 8,438,647 B2  
APPLICATION NO.   : 11/523968  
DATED             : May 7, 2013  
INVENTOR(S)       : David Alexander Jevans Page 1 of 1

It is certified that error appears in the above-identified patent and that said Letters Patent is hereby corrected as shown below:

Specification

| Column | Line | PTO | Should Be |
|---|---|---|---|
| 3 | 1 | authorization quest from the | authorization request from the |
| 4 | 57 | example, he user depresses | example, the user depresses |
| 5 | 14 | connector 110 couple | connector 110 coupled |
| 8 | 2 | input 130 IN FIG. 1) | input 130 in FIG. 1) |
| 10 | 9 | command to sent to the | command to send to the |
| 11 | 54 | encrypt all of a portion | encrypt all or a portion |
| 12 | 10 | device 100 FIG. 1) | device 100 (FIG. 1) |

Claims

| Column | Line | PTO | Should Be |
|---|---|---|---|
| 16 | 61 | retrieving an encryption key from an the authorized | retrieving an encryption key from the authorized |

Signed and Sealed this  
Twentieth Day of August, 2013

Teresa Stanek Rea  
*Acting Director of the United States Patent and Trademark Office*